United States Patent Office 2,782,187
Patented Feb. 19, 1957

2,782,187
AZO DYES FOR POLYESTER FIBER

Mario Francesco Sartori, Monroe Park, Del., assignor to E. I. du Pont de Nemours and Company, Wilmington, Del., a corporation of Delaware No Drawing. Application October 1, 1954,
Serial No. 459,829

6 Claims. (Cl. 260—205)

This invention relates to novel azo dyes adapted for dyeing hydrophobic fiber, such as "Dacron" polyester fiber. It is an object of this invention to provide azo dyes adapted to produce upon the mentioned fiber bright, orange to red dyeings having, in addition to good light-fastness, a high degree of sublimation fastness. Other important objects and achievements of this invention will appear as the description proceeds.

The problem of sublimation may be described as the tendency of the dyeing to sublime and fade onto adjoining fabrics or onto adjacent areas of the same fabric under the influence of high temperature. The problem of producing dyeings of good fastness to light and to sublimation has been particularly keen in the case of polyester fiber, because of the high temperatures to which such fiber is often subjected. For instance, if a suit made of "Dacron" polyester fiber is pressed to set creases therein, the high temperature required by this process will often cause the dye to sublime off the fiber and re-deposit on adjacent areas of the suit. This results in smearing or staining of the pattern, and is highly objectionable.

The problem of light-fastness by itself may be solved by using dispersed anthraquinone dyes or other known dyes, but these dyeings generally lack adequate sublimation fastness. Particularly wanting were colors of the mentioned fastness qualities in the range of orange to red.

Now, this invention provides novel azo dyes, adapted to dye polyethylene-terephthalate in bright orange to red shades, characterized by good light fastness, and satisfying, in particular, the requirement of sublimation fastness.

The novel dyes of this invention are p-nitrophenylazo-aniline compounds, distinguished by having two cyanoethyl radicals in the aniline N-atom. They may be defined by the general formula

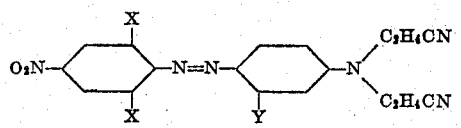

wherein the X's designate hydrogen or halogen, for instance fluorine, chlorine or bromine; while Y represents hydrogen or a lower alkyl radical (1 to 4 C-atoms).

These dyes may be synthesized by diazotizing p-nitroaniline or an ortho monohalogen or dihalogen derivative thereof, and coupling the same to bis(beta-cyanoethyl) aniline, or a homolog thereof, bearing in meta position a methyl, ethyl, propyl or butyl radical.

The application of the novel dyes to polyester fiber may follow known dyeing procedure for these fibers, for instance (1) conventional aqueous dyeing, (2) aqueous pressure dyeing or (3) aqueous "carrier" dyeing.

The conventional dyeing procedure is suitable for obtaining light shades. Dyeing temperature should be as close to the boil as possible, since lower temperatures will reduce the rate of color absorption. The pressure dyeing technique is suitable for raw stock, thread, yarn, etc., which can be handled in a kier suitable for pressure work. Temperatures of about 240 to 250° F. at 10 to 15 pounds per square inch gauge are used.

The preferred dyeing technique is the "carrier" method. The use of "carriers" such as benzoic acid, salicylic acid and o-phenylphenol in the dye bath provides good color build-up, gives good leveling characteristics and offers no problem in removing the carrier from the dyed fibers. The benzoic or salicylic acid is used at concentrations of about 20 grams per liter of dyebath. To avoid any insoluble particles adhering to the fiber and causing blotchiness, the sodium salt of the carrier is preferred. The salt can be added to the bath with the dye, and after raising the temperature to the boil, sulfuric acid is added to obtain the free acid. Sodium o-phenylphenate is used to give heavy shades. The free phenol is obtained by adding acetic acid to the dyebath. It is important that the carrier be completely removed from the fiber after dyeing to avoid reduction in dye fastness properties caused by traces of the carrier.

Although emphasis has been placed above, in view of its economic importance, on the dyeing of "Dacron" polyester fiber, my novel dyes are applicable also, with excellent results, on cellulose acetate or other hydrophobic fiber.

Dry sublimation fastness is tested for by placing patches of various fabrics adjacent to a dyed polyester fabric and applying a hot iron for several minutes. The severity of the test is controlled by the temperature of the iron and the time of contact. Numerical ratings at prescribed conditions are used to express the degree of resistance to sublimation. A rating of 4 to 5 is considered excellent, 3 good, and 2 or less unacceptable.

In tests as described above, the dyes of this invention were compared with analogous azo dyes which have but one beta-cyanoalkyl radical in the N-atom of the aniline component, the other substituent on the N-atom being an alkyl radical (e. g. ethyl) or a hydroxyalkyl radical (e. g. beta-hydroxyethyl). It was found that the presence of two beta-cyanoethyl radicals in the mentioned N-atom is essential to the joint presence of light fastness and sublimation fastness. The numerical rating went up from 2 for several monoethyl-monocyanoalkyl compounds to 4 or 5 for the bis-cyanoethyl dye. In other dyes having two beta-hydroxyethyl radicals on the N-atom in question, the sublimitation fastness was found satisfactory but the light fastness was poor.

Without limiting this invention, the following examples are given to illustrate my preferred mode of operation. Parts mentioned are by weight.

EXAMPLE 1

*4-nitrophenylazo-N-bis(cyanoethyl)-aniline*

70 parts of 4-nitroaniline were added to a solution of 175 parts of concentrated hydrochloric acid (37%) in 1000 parts of water and stirred until a homogeneous suspension was obtained. After cooling to about 10° C., 35 parts of sodium nitrite were added and the mixture was stirred at 10° C. for 45 minutes. Sufficient sulfamic acid was added to destroy the excess nitrous acid. The diazo solution was filtered, cooled to 0-5° C. and entered, together with about 650 parts of sodium acetate into a mixture of 100 parts of N,N-bis-cyanoethyl aniline (Jour. Chem. Soc. 1934, pg. 1536), 236 parts of concentrated hydrochloric acid and about 500 parts of water and ice. The resultant mixture was then stirred without further cooling for 16 to 20 hours. The formed dye was filtered off, washed and dried. A yield of 189 parts of color was obtained. It dyed "Dacron" polyester fiber and acetate in orange shades having good light fastness and sublimation properties.

EXAMPLE 2

*2-chloro-4-nitrophenylazo-N-bis(cyanoethyl)-m-toluidine*

By substituting in Example 1, 86 parts of 2-chloro-4-nitroaniline for the 4-nitronaniline, and 107 parts N,N-bis-cyanoethyl-m-toluidine for the corresponding aniline derivative, and following the same procedure, a yield of 125 parts of dye was obtained. It gave on polyethyleneterephthalate red shades of good light- and sublimation-fastness.

EXAMPLE 3

*2-chloro-4-nitrophenylazo-N-bis(cyanoethyl)-aniline*

By using 2-chloro-4-nitroaniline and N,N-bis-cyanoethyl aniline, but following otherwise the procedure of Example 1, an orange dye was obtained which gave on polyester fiber dyeings of excellent light fastness and sublimation properties.

EXAMPLE 4

*4-nitrophenylazo-N-bis(cyanoethyl)-m-toluidine*

The dye prepared in similar manner from 4-nitroaniline and N,N-bis-cyanoethyl-m-toluidine was an orange dye of similar fastness properties.

EXAMPLE 5

*2,6-dichloro-4-nitrophenylazo-N-bis(cyanoethyl)-aniline*

By using 2,6-dichloro-4-nitroaniline and N,N-bis-cyanoethyl aniline, an orange dye was obtained which gave on polyester fiber dyeings of excellent light fastness and sublimation properties.

I claim as my invention:

1. An azo dye of the general formula

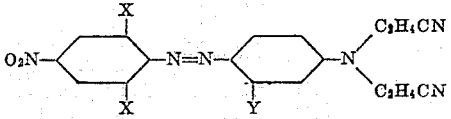

wherein the X's designate members of the group consisting of hydrogen and halogen, while Y represents a member of the group consisting of hydrogen and lower alkyl.

2. 4-nitrophenylazo-N-bis(cyanoethyl)-aniline.
3. 2 - chloro-4-nitrophenylazo-N-bis(cyanoethyl) - aniline.
4. 4-nitrophenylazo-N-bis(cyanoethyl)-m-toluidine.
5. 2 - chloro-4-nitrophenylazo - N - bis(cyanoethyl)-m-toluidine.
6. 2,6-dichloro - 4 - nitrophenylazo-N-bis(cyanoethyl)-aniline.

References Cited in the file of this patent
UNITED STATES PATENTS 2,649,440   Dickey et al. _____ Aug. 18, 1953

OTHER REFERENCES

Knight, Jr.: Soc. Dyers & Colorists, vol. 66, No. 3, March 1950, pg. 170.